J. C. A. POINTE.
APPARATUS FOR THE TREATMENT OF CORN, GRAIN, FRUIT, AND THE LIKE.
APPLICATION FILED APR. 22, 1913.

1,244,774.

Patented Oct. 30, 1917.
2 SHEETS—SHEET 1.

Witnesses:
G. M. Hulst
E. B. Anderson

Inventor:
J. C. A. Pointe
per Edgar S. Brittell
Attorney.

J. C. A. POINTE.
APPARATUS FOR THE TREATMENT OF CORN, GRAIN, FRUIT, AND THE LIKE.
APPLICATION FILED APR. 22, 1913.

1,244,774.

Patented Oct. 30, 1917.
2 SHEETS—SHEET 2.

Inventor:
James Charles Adrien Pointe.
per H. W. Plucker
Attorney.

UNITED STATES PATENT OFFICE.

JAMES CHARLES ADRIEN POINTE, OF DIJON, FRANCE.

APPARATUS FOR THE TREATMENT OF CORN, GRAIN, FRUIT, AND THE LIKE.

1,244,774.　　　　　Specification of Letters Patent.　　Patented Oct. 30, 1917.

Application filed April 22, 1913. Serial No. 762,849.

*To all whom it may concern:*

Be it known that I, JAMES CHARLES ADRIEN POINTE, a citizen of the Republic of France, residing at 12 Rue Ferdinand de Lesseps, Dijon, in the Republic of France, have invented certain new and useful Improvements in Apparatus for the Treatment of Corn, Grains, Fruit, and the like, of which the following is a specification.

At present the transformation of wheat into bread and in general the transformation of grains into paste, necessitates two distinct and successive operations firstly grinding, secondly panification.

By means of the present invention these two operations are eliminated and the transformation, for instance, of wheat into paste susceptible of making white bread, is carried out in one operation by the enucleation of hot hydrated wheat previously neutralized and sterilized and sufficiently softened to free, under the action of appropriate pressure, the white matter from the husk containing it.

This operation is carried out by a hydro-pulp extractor device which forms one of the features of the invention. It discharges a homogeneous paste on one side and husks in the form of bran, on the other.

The invention consists in macerating the grains firstly with a view to neutralizing the diastases and oxydases contained in the treated substances and secondly in view of softening the grains and in hydro-pulp-extracting device permitting of carrying out certain stages of this process.

In the accompanying drawing one form of construction is shown by way of example.

Figure 1:
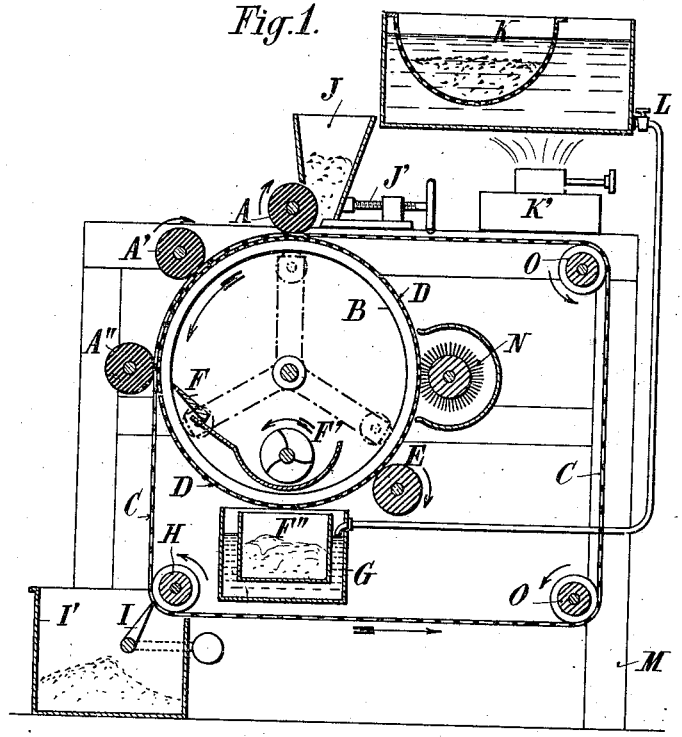
Figure 1 shows diagrammatically, partly in elevation, partly in section, an apparatus for treating corn, seeds, fruit and the like in accordance with the invention.
Figure 2:
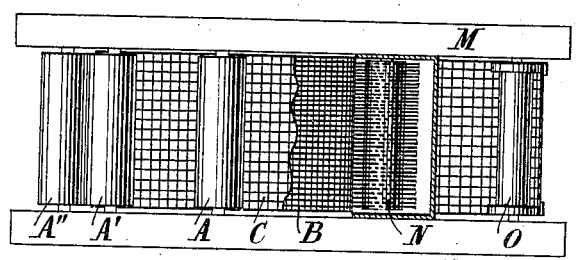
Figs. 2 and 3 show diagrammatically, in plan and in section, respectively, certain constituent parts of the said apparatus.
Figure 4:
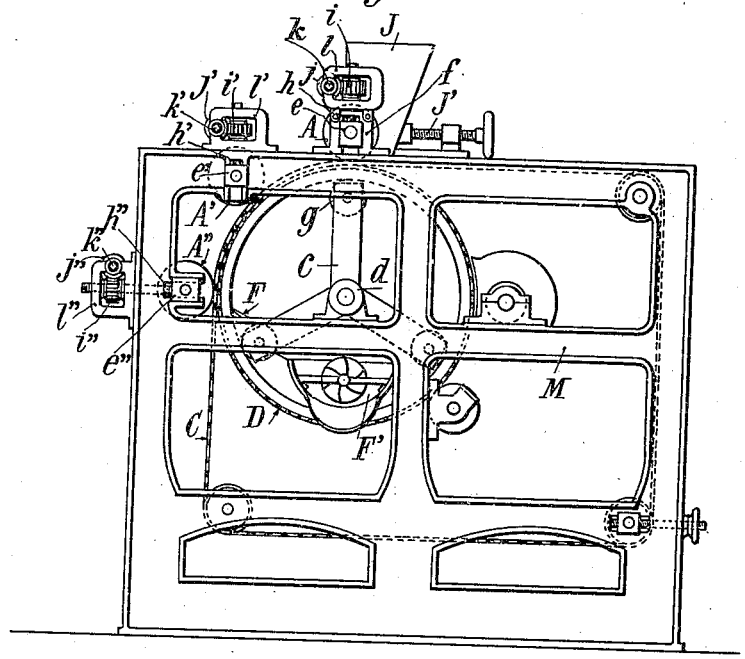
Fig. 4 is an elevation of the apparatus shown in Fig. 1.

The hydro-pulp-extracting apparatus has a rubber covered cylinder A provided with a regulating device permitting of increasing or decreasing the pressure. The regulating device illustrated in Fig. 4 comprises a bracket $l$ secured to the frame of the apparatus, and a screw $h$ mounted to rotate in the bracket $l$ and adapted to engage a slidable bearing $e$ in which the cylinder A is journaled. On the screw $h$ is mounted an internally threaded pinion $i$ which meshes with a worm $j$ carried by a shaft $k$. By rotating the shaft $k$ the screw $h$ will be moved endwise and the bearing $e$ with the cylinder A will be moved toward or from a drum B to be hereinafter described. The action exerted by the cylinder A may be repeated by means of cylinders A′, A″, and so forth, reproducing under the same conditions the action of the cylinder A. The parts forming the regulating devices for the cylinders A′ and A″ are designated by the same reference letters as the corresponding parts of the device described in connection with cylinder A, but they are provided with the indices ′ and ″ respectively. They may act separately or simultaneously so as to carry the extraction to a more or less advanced degree and to produce different products.

Figure 3:
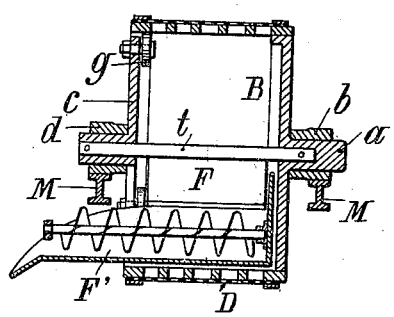

B is a drum, called the recipient, which is cylindrical and hollow, and provided on one side with an axis $a$ and supported, on the other, by rollers $g$. These rollers are carried by a support $c$ mounted on a shaft $t$ which is mounted to rotate in bearings $d$ and $b$, (Fig. 3.) The revolving surface is latticed or grated so as to permit the paste which has traversed the wire gauzes or perforated sheets C and D, to penetrate into the interior of the drum where it is gathered.

An upper wire gauze or perforated sheet C is provided, called the bran sheet, forming an endless band enveloping the wire gauze or perforated sheet D, called the sifting and paste sheet. The gauze or sheet C is coarser than the gauze or sheet D.

The metallic gauze or perforated sheet D rests on the external surface of the drum and covers it sleevelike. This gauze or sheet is fixed on the drum by its edges by means of adjustable fixing hoops.

These two gauzes or sheets are removable and susceptible of being changed. They are of varying grades according to the kind of grains treated and according to the nature of products to be obtained.

A rubber covered cylinder E of variable pressure is provided for the purpose of forcing the paste, by its elastic pressure, into the interior of the drum through the gauze or sheet D and the grating which limits the cylinder B.

All the cylinders and the gauzes or sheets are rotated simply by frictional contact by the drum B and in the directions indicated by the arrows in the drawing.

A trap-scraper F is located within the drum B. The paste projecting through the grating of the drum B knocks against the scraper whereon it slides until it reaches the receptacle forming a dough trough. In this trough a winged Archimedean screw rotates so as to knead the paste and to mix it with other matter to be added such as ferments, yeast, fat, sugar, perfumes and so forth. From the kneading trough the completed and finished paste is carried by the progressive motion of the winged Archimedean screw to the paste trough F''.

A hot water basin is provided in which the paste trough F'' is placed.

A rubber covered roller H called the bran extractor is used to force the husks through the gauze or perforated sheet C while they are seized and detached by the scraper I.

A scraper I serves to detach the husks and to cause them to drop in the bran trough.

A bran trough I' receives the husks scraped by the scraper I.

The feeder J consists of a hopper provided with regulator J' parallel to the gauze C and opening the hopper onto this gauze.

The feed of the grains is also controlled by the opening of the regulator and it is caused by the progressive motion of the gauze or sheet C and by the converging rotation of the cylinder A.

The macerator K is provided with a sieve to suspend the products of maceration. This macerator is provided with a controllable heating apparatus K' and with a hot water distributing valve L.

A valve L and pipe supply the hot water basin with hot water.

A foundation M of wood or of cast iron supports the whole apparatus.

The cylindrical brush N clears the gauze D from particles of cortical matter.

Two hollow rollers of varying tension allow the gauze or sheet C to move.

*Process and operation.*—The grains, seeds, fruit and so forth are subjected to a double maceration, the first, a chemical one, is in order to neutralize the disastases or oxydases contained in the substance and to render the products appropriate for their industrial destination.

The second, a physical one, is in order to produce a sufficient softening to permit of ready enucleation of the grains.

*Cleaning the wheat.*—The cleaning of the wheat which for dry-grinding requires several complicated apparatuses, is effected by washing it with plenty of water. The light part such as damaged bad grains and so forth, straws, light grains, are eliminated simply by the overflow of the receptacle. The heavy grains, vetches, corn, cockles and so forth, do not soften and escape the enucleation produced by the cylinders; they are found untouched together with the husks with which they are eliminated. The earth disintegrates and drops to the bottom together with the stones which always reach the bottom of the receptacle owing to their high density.

The wheat thus cleaned is ready for the subsequent operations.

*First maceration.*—It consists in preparing with hot or cold water a solution of sodium chlorid which may be saturated indicating 25° on the salinometer; and in immersing therein the grains so as to neutralize the diastases or oxydases. As an indication of the time taken the duration of immersion, for medium wheat it may last up to one hour at a temperature of 20 to 30° C. in a solution indicating 20 to 25° on a salinometer. These numbers vary for the various species of grains, seeds, fruit and so forth.

The temperature of the solution, the duration of the immersion and the percentage of salt should be proportional to the resistance of the products, the permeability and sensibility of which are different for each species. When the maceration is finished the grains should be withdrawn from the solution and left to drip. This solution may serve indefinitely; in case it should become charged with foreign bodies it is sufficient to boil and filter it so as to restore its primary efficacy.

*Second maceration.*—This consists in placing the wet grains in the macerator K, filled with hot water and maintained at a temperature sufficiently high to effect the complete softening of the products. Temperature and duration of maceration are different for each species of grain. In a general manner the temperature should not exceed that at which the albuminous matter will coagulate.

When the grains allow their contents to be pressed out by the fingers they should be transferred to the distributer J.

Next, the motor should be started.

The feeder J discharges the grains on the gauze C and being carried away by the same they are squeezed between the cylinder A and the drum B. The cylinder A exerts on these grains its double action of pressure and traction. Under this action the grains open and spread out and the rubber, owing to its yielding pressure forces the soft pulp through the meshes or perforations of the gauze or sheet C which retains the husks. The latter are carried away by the gauze or sheet C, knock against the scraper I which detaches and causes them to drop into the bran receptacle J'.

The soft pulp is taken up and carried away with the gauze or sheet D and is subjected to the yielding pressure of the cylinder E which pushes it in the interior of the drum B. It collects upon the scraper F which detaches and causes it to slide down into the dough trough and after having been kneaded and completely treated it reaches the paste trough F″.

The machine allows by varying the pressures and the fineness of the wire gauzes or sheets, various products of diverse qualities to be produced.

What I claim and desire to secure by Letters Patent of the United States is:

1. In a hydro-pulp-extractor of the kind set forth, the combination of a rotary drum provided with a peripheral sheet of metallic gauze, an endless sheet of metallic gauze coarser than the drum gauze, means for pressing the two sheets against each other, means for feeding the material, means for pressing it onto the endless metallic sheet and means for removing the paste traversing the sheet of the rotary drum.

2. In a hydro-pulp-extractor of the kind set forth, the combination of a single drum provided with a peripheral sheet of metallic gauze, an endless sheet of metallic gauze coarser than the drum gauze, means for pressing the two sheets against each other, a grain-feeder comprising a hopper and a register for controlling the supply of grain, means for pressing the material against the endless sheet, and means for removing the paste collected within the rotatable drum carried along by the metallic sheet.

3. In a hydro-pulp-extractor of the kind set forth, the combination of a rotary drum provided on its periphery with a sheet of metallic gauze, an endless sheet of metallic gauze coarser than the drum gauze, said endless sheet bearing on a portion of the drum's periphery, a grain-feeder, resilient means for pressing the grain onto said endless sheet and at the same time pressing said endless sheet against the drum sheet, means for collecting the paste within the drum and means for removing the paste.

4. In a hydro-pulp-extractor of the kind set forth, the combination of a rotary drum provided on its periphery with a flexible sheet of metallic gauze, a flexible endless sheet of metallic gauze coarser than the drum gauze and bearing on a portion of the drum's periphery, a grain feeder, rubber cylinders adapted to press against the metallic sheets, supporting members for said cylinders adapted to be moved toward and away from the drum, means for collecting the paste within the drum, means for removing the paste and means for collecting the husks.

5. In a hydro-pulp-extractor of the kind set forth, the combination of a rotary drum provided on its periphery with a flexible sheet of metallic gauze, a flexible endless sheet of metallic gauze coarser than the drum gauze and bearing on a portion of the drum's periphery, a grain feeder comprising a hopper, a register adapted to move thereunder and a screw on said hopper for controlling said register, rubber cylinders adapted to press against the metallic sheets, supporting members for said cylinders adapted to be moved toward and away from the drum, and two scrapers one of which bears on the internal surface of the sheet of the drum and the other on the external surface of the endless sheet.

In testimony whereof I affix my signature in presence of two witnesses.

JAMES CHARLES ADRIEN POINTE.

Witnesses:
MARCILLES FRANÇOIS,
NICOLAS CHAPUIS.

Copies of this patent may be obtained for five cents each, by addressing the "Commissioner of Patents, Washington, D. C."